United States Patent [19]

Braeger et al.

[11] Patent Number: 4,635,318
[45] Date of Patent: Jan. 13, 1987

[54] APPARATUS FOR DECAPITATING FISH

[75] Inventors: Horst Braeger, Lübeck, Fed. Rep. of Germany; Örn Johannesson, Reykajavik, Iceland

[73] Assignee: Nordischer Maschinenbau Rud. Baader GmbH & Co KG, Lubeck, Fed. Rep. of Germany

[21] Appl. No.: 715,980

[22] Filed: Mar. 25, 1985

[30] Foreign Application Priority Data

Mar. 28, 1984 [DE] Fed. Rep. of Germany ....... 3411365

[51] Int. Cl.$^4$ ...................... A22C 25/08; A22C 25/14
[52] U.S. Cl. ..................................................... 17/63
[58] Field of Search .................. 17/52, 57, 59, 60, 61, 17/63; 83/732

[56] References Cited

U.S. PATENT DOCUMENTS 4,389,750  6/1983  Kristinsson et al. ................. 17/63
4,476,610 10/1984  Wenzel ............................. 17/63 X

FOREIGN PATENT DOCUMENTS 2735302  2/1978  Fed. Rep. of Germany .
3211179 11/1982  Fed. Rep. of Germany .......... 17/63
518608   3/1940  United Kingdom ................. 17/63

Primary Examiner—Willie G. Abercrombie
Attorney, Agent, or Firm—Thomas R. Morrison

[57] ABSTRACT

The invention concerns a decapitating apparatus for fish in which the fish to be processed is conveyed by entrainers essentially transverse to its axis and by fixing its longitudinal position by a holding element engaging the eye-hole and accompanying the fish. For adjusting the holding element a guide bar is arranged for engaging the holding element in a guiding manner in the region of a severing device performing a wedge-shaped decapitating cut and for displacing the holding element resiliently out of its path of movement.

6 Claims, 3 Drawing Figures

U.S. Patent    Jan. 13, 1987    4,635,318
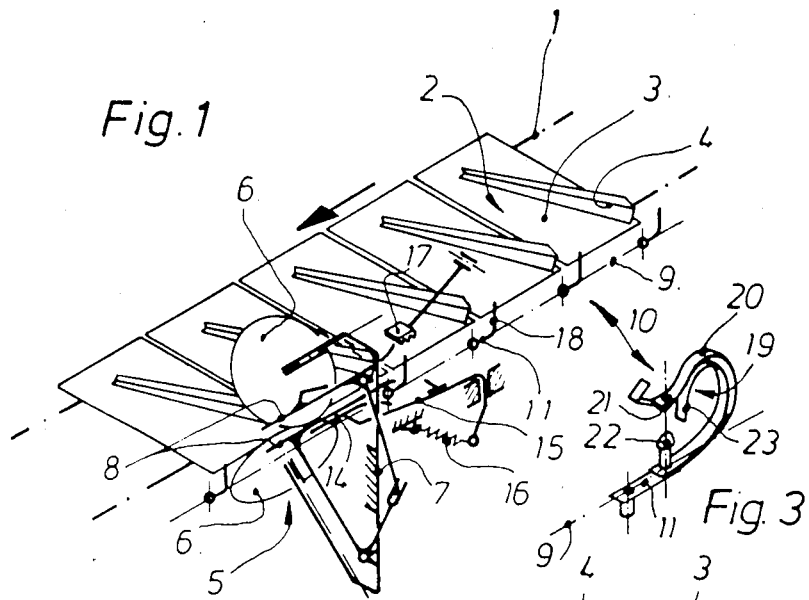
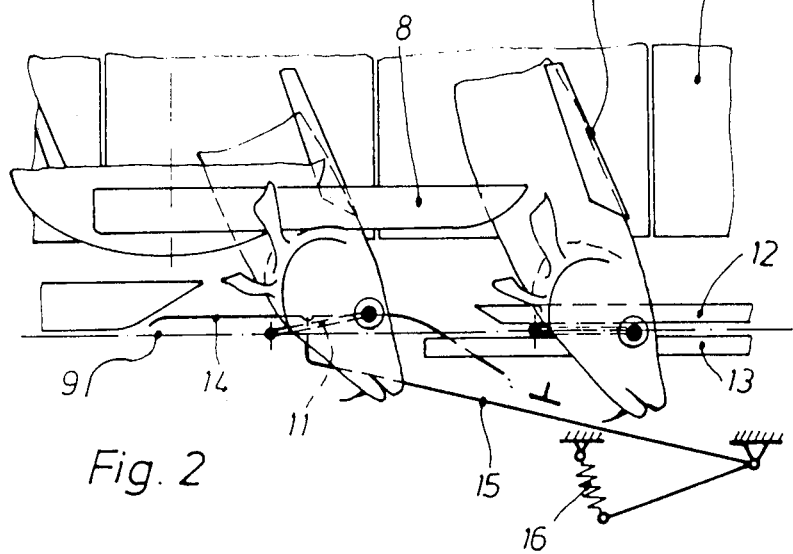

APPARATUS FOR DECAPITATING FISH

BACKGROUND OF THE INVENTION

1. Field of the Invention

The invention concerns an apparatus for decapitating fish, comprising a conveying device for advancing fish transverse to their longitudinal axis, which conveying device comprises a conveyor for receiving the rumps of the fish and provided with entrainers, and an auxiliary conveyor for receiving the heads of the fish guided parallel to the conveyor and equipped with holding elements adjustable in their position with respect to the path of the entrainers, the apparatus further comprising a severing device for performing a wedge-shaped cut by means of knives, this severing device being arranged between the conveyor and the auxiliary conveyor and having guide rails, which are arranged to be displaced by the fish synchronously in an opposing manner and positioned essentially in the plane of the knives.

2. Description of Prior Art

An apparatus of this type can be taken from DE-OS No. 27 35 302, in which apparatus fish positioned on an entraining conveyor lying on their sides and belly first are supplied to a severing aggregate for performing a wedge-shaped cut. In this apparatus a pin or a pair of pins penetrating into the eye-hole, respectively, locate the fish in the direction of their longitudinal axes, whereby a pre-alignment of the fish is effected. The pins are adjustable in their position with respect to the cutting planes of the severing aggregate. A coupling mechanism is provided for the adjustment in dependence on the thickness of the respective fish head, which mechanism effects a transmission of the measuring position of two measuring arms to the pins, which arms are synchronised in an opposing manner and detect the head thickness of the fish. Thereby it is to be achieved that each fish is positioned according to its respective size such that each decapitating cut can be performed with a yield of flesh as high as possible. This works essentially without any adjustment as long as the isthmus connecting the head of the fish with its rump on the belly side has been severed by a preceding processing step, i.e. if the gill cavity is opened ventrally. If, however, fish are processed which have not been prepared in this manner before, the coupling mechanism must be adjusted correspondingly. However, it has been found that such an adjustment only enables the processing of a relatively small range of sizes with the desired economy.

OBJECTS OF THE INVENTION

Therefore, it is an essential object of the present invention to improve the known fish decapitating apparatus such that the cutting result can be obtained automatically at a uniformly good yield over the whole range of varying sizes of fish coming to be processed. It is another important object of the invention that the manner in which the fish are prepared as well as, to a certain extent, the fish species remain without influence on the decapitating.

SUMMARY OF THE INVENTION

In a fish decapitating apparatus comprising a conveying device for advancing fish transverse to their longitudinal axis, which device includes a conveyor for receiving the rumps of the fish and provided with entrainers, and an auxiliary conveyor for receiving the heads of the fish guided parallel to the conveyor and equipped with holding elements adjustable in their position with respect to the path of the entrainers, the apparatus further comprising a severing device for performing a wedge-shaped cut, this severing device being arranged between the conveyor and the auxiliary conveyor and having guide rails which are arranged to be displaced by the fish synchronously in an opposing manner and positioned essentially in the plane of the knives, these objects are achieved according to the present invention in that the holding elements are guided to be displaced towards the conveyor by spring force in the region of the wedge-shaped cut severing device.

The advantages thus to be obtained in particular reside in that the fish come to lie against the guide rails under defined spring force with the edges of their shoulder girdle arcs, which edges are facing the rump, so that the severing cut is performed safely in the region of these edges, i.e. extremely economically. Furthermore, the fact that the engagement of said edges with the guide rails occurs approximately in the centre of the height of the fish whereas the displacement force engages above the centre of the fish height effects that a torsional tension becomes effective on the head, which tension effects a tilting of the head in the course of the severing cut. Thereby, an extremely high gain in neck flesh becomes possible.

Expediently the displacing of the holding elements is performed by a guide bar arranged to be held swivelled into the path of the holding elements by spring force to engage the holding elements in a guiding manner.

For processing medium size to large fish it has proved advantageous if each holding element comprises a pin holding the head of the fish by penetrating its eye-holes.

A preferred device for processing smaller fish is characterised in that each holding element comprises a pair of pincers, whose legs are displaceable apart relatively to each other against spring force and are provided with shaped pieces arranged to oppose each other for holding the head of the fish by penetrating into the eye-holes thereof. Thus a sufficiently secure fixation is obtained while a quick supplying of fish is possible.

The pair of pincers can be arranged to be swivelled additionally about the axis of the two shaped pieces in order to maintain the alignment of the pincers relative to the fish also during the displacement by the guide bar.

In order to avoid the breast fins of the fish to be processed disturbing the engagement of said edge of the shoulder girdle arc with the guide rails, a fin erector may be arranged upstream of the region of the severing device above the path of the conveyor and adapted to be displaced essentially in the plane of the guide rails against spring force by the fish to be processed.

BRIEF DESCRIPTION OF THE DRAWINGS

Other and further objects of the present invention will be apparent from the following description and claims and are illustrated in the accompanying drawings, which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings FIG. 1 a diagrammatic partial view of the apparatus in axonometric representation FIG. 2 a diagrammatic partial top view of the apparatus FIG. 3 a holding element arranged as pincers in axonometrical partial representation.

DESCRIPTION OF THE PREFERRED EMBODIMENTS

A conveyor 1 driven to rotate endlessly is arranged in a not-represented frame of a fish decapitating machine designed in a usual and known manner. The conveyor 1 is provided with entrainers 4 extending upwardly from bottom surfaces 3 of conveyor pockets 2 formed on the conveyor. Besides the running path of the conveyor 1 a severing device 5 for performing a wedge-shaped cut on a fish to be processed is arranged. The severing device 5 comprises a pair of knives 6 located inclined to each other and contacting each other above the plane of the bottom surfaces 3. The knives 6 are provided in the form of circular knives. The ends of the entrainers 4 facing the knives 6 are adapted according to the angle of inclination of the circular knives 6, this angle opening towards the conveyor pockets 2. The circular knives 6 are mounted in a housing 7 and driven in a suitable manner to rotate in opposite directions. On the housing 7, there is arranged a pair of skid-shaped guide rails 8. These rails 8 are mounted directly adjacent to the planes of the circular knives not facing the conveyor pockets 2 in a manner to be pivoted synchronously in opposing directions in the planes of the knives. The rails are held in a narrow position by the force of a non-shown tension spring. On their sides facing the severing device 5, the conveyor pockets 2 are accompanied by an auxiliary conveyor 9 provided with holding elements 10, which are formed as pins 18 in the embodiment shown in FIGS. 1 and 2. The distance between the pins 18 corresponds to the pitch of the entrainers 4. The holding elements 10 are attached to entraining levers 11 which, on their behalf, are linked articulatedly to the auxiliary conveyor 9 so that the holding pins 18 can be swivelled out of the plane of deflection of the auxiliary conveyor 9. In the region upstream of the severing device 5 there is arranged a pair of guides 12, 13 forming an inner guide 12 and an outer guide 13 for guiding the holding elements 10 therebetween. The guides 12, 13 are arranged parallel to the path of the conveyor 1. The outer guide 13 is followed by a guide bar 14 in the region of the severing device 5. This bar 14 is attached to a pivot lever 15 which can be swivelled outwardly against the force of a spring 16. A fin erecting device 17 is arranged above the conveyor 1 upstream of the severing device 5. It is the task of this fin erector 17 to loosen the breast fin of the fish from its body to which it may adhere due to mucilage.

Selectively and as shown in FIG. 3 the auxiliary conveyor 9 may be provided with holding elements in the form of a pair of pincers 19 each of which has a resilient leg 20. This leg 20 carries an upper shaped piece 21 which opposes a lower shaped piece 22. The latter juts from the entraining lever 11 and forms a pivot axis for the leg 20, which is provided additionally with a resilient auxiliary stop 23.

The function of the apparatus will be explained in the following by way of the passage of a fish therethrough in the direction of the arrow shown in FIG. 1:

A fish supplied to the apparatus in a suitable manner by a person serving the apparatus is placed belly first in one of the conveyor pockets 2 and positioned such that the corresponding pin 18 fixes the fish by penetrating into the lowermost eye-hole. Shortly before the fish arrives at the severing device 5 it gets between the pair of skid-shaped guide rails 8, which are spread apart by the fish body. Before this, the fish has passed the fin erector 17 which by retaining the breast fin has loosened the latter from the fish body to which it may have adhered by mucilage. After entering between the guide rails 8 the pin 18 fixing the fish runs onto the guide bar 14 with its shaft, from which bar it is displaced by entrainment towards the conveyor pockets 2 due to the force of the spring 16. This operation continues until the shoulder girdle arcs standing out a little from the fish body by the pressure of the guide rails 8 are caught behind their rearward edge. The fish has now obtained its favourable position for decapitating and thus arrives below the circular knives 6 which cut off the head directly adjacent to said edges of the shoulder girdle arcs. During this process the pressure exerted on the pin 18 by the spring 16 via the guide bar 14 is maintained so that with continuing separation the neck flesh is pressed into the working plane of the circular knives partly by a swivelling action of the head and partly by an upsetting pressure on the muscle flesh.

In the case that the auxiliary conveyor 9 is equipped with pincers 19 (FIG. 3) the fish with its head is pulled underneath the leg 20 in the level of the eyes whereby the leg is displaced until the shaped pieces 21 and 22 catch the eye-holes. Due to the pivotability of the pincers 19 about the axis of the shaped pieces 21, 22 the pincers 19 also remain aligned in the conveying direction during the displacement of the entraining lever 11 by the guide bar 14.

The processing operation takes its course independent of the respective size of the fish in the same manner as described before because the guide bar 14 basically effects a displacement of the respective fish under the force of the spring 16 until the guide rails 8 fix the fish in said manner.

What is claimed is:

1. Apparatus for decapitating fish comprising:
a first conveyor;
said first conveyor including means for conveying a fish along a first conveying axis;
first and second opposed inclined knives positioned to sever a head of said fish as it is conveyed therepast along said first conveying axis;
at least one guide rail disposed closely adjacent said first knife and having a guide edge parallel to said first conveying axis;
a second conveyor having a second conveying axis generally parallel to said first conveying axis;
said second conveyor including at least one entraining lever;
said at least one entraining lever having a trailing device pivotable transversely to said second conveying axis;
said trailing device including means for engaging said fish; and
means for resiliently displacing said trailing device toward said at least one guide rail in a vicinity of said first knife until guiding contact is attained between said guide edge and a part of said fish, whereby said fish is positioned for minimum loss of flesh during decapitation.

2. Apparatus according to claim 1 wherein said means for engaging said fish includes at least one pin for entering an eyehole of said fish.

3. Apparatus according to claim 2 wherein said means for engaging said fish further includes pincers having first and second legs, at least said first leg being resiliently displaceable with respect to said second leg, and at least one of said first and second legs including means for engaging an eyehole of said fish for retention thereof.

4. Apparatus according to claim 3 wherein said means for engaging said fish further includes means for permitting said pincers to rotate about an axis of said means for engaging an eyehole.

5. Apparatus according to claim 1 wherein said means for engaging said fish includes pincers having at least one resilient leg, and means for engaging at least one eyehole of said fish for retention thereof.

6. Apparatus according to claim 5 wherein said means for engaging said fish further includes means for permitting said pincers to rotate about an axis of said means for engaging an eyehole.

* * * * *